(12) United States Patent
Walsh et al.

(10) Patent No.: US 7,027,414 B2
(45) Date of Patent: Apr. 11, 2006

(54) METHOD, APPARATUS, AND SYSTEM FOR IDENTIFYING AND EFFICIENTLY TREATING CLASSES OF TRAFFIC

(75) Inventors: William Walsh, Anaheim Hills, CA (US); Mark Abinante, Inglewood, CA (US); Craig Schweinhart, Rockville, MD (US); Anthony Heatwole, Damascus, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 936 days.

(21) Appl. No.: 09/925,177

(22) Filed: Aug. 9, 2001

(65) Prior Publication Data

US 2003/0035385 A1 Feb. 20, 2003

(51) Int. Cl.
*H04B 7/185* (2006.01)
*H04L 12/56* (2006.01)

(52) U.S. Cl. .................. 370/316; 370/392; 370/395.21
(58) Field of Classification Search ............... 370/230, 370/230.1, 316, 412, 468, 395.2, 395.21, 370/395.4, 389, 392
See application file for complete search history.

(56) References Cited

U.S. PATENT DOCUMENTS

| | | | |
|---|---|---|---|
| 4,346,470 A | * | 8/1982 | Alvarez et al. ............. 370/324 |
| 5,796,956 A | | 8/1998 | Jones |
| 5,812,545 A | * | 9/1998 | Liebowitz et al. .......... 370/337 |
| 6,038,594 A | | 3/2000 | Puente et al. |
| 6,604,146 B1 | * | 8/2003 | Rempe et al. ............. 709/238 |
| 6,654,344 B1 | * | 11/2003 | Toporek et al. ............ 370/230 |
| 6,842,437 B1 | * | 1/2005 | Heath ........................ 370/322 |

FOREIGN PATENT DOCUMENTS

| | | |
|---|---|---|
| EP | 0 884 874 A | 12/1998 |
| EP | 0 923 268 A2 | 6/1999 |

* cited by examiner

*Primary Examiner*—Brian Nguyen
(74) *Attorney, Agent, or Firm*—Craig Plastrik

(57) ABSTRACT

An approach for processing packets for transmission over a satellite communications network is disclosed. A communication system includes a satellite terminal that provides connectivity for a host. The satellite terminal includes a user interface that receives a packet associated with an application from the host, and classification logic that classifies the packet into one of a plurality of transport services based upon the corresponding application. The satellite terminal also includes a mapping logic that maps the one transport service to one of a plurality of packet delivery services, wherein the one packet delivery service provides transmission of the packet to the satellite. The system also includes a hub that is configured to communicate with the satellite terminal over the satellite to provide the plurality of packet delivery services.

48 Claims, 10 Drawing Sheets

METHOD, APPARATUS, AND SYSTEM FOR IDENTIFYING AND EFFICIENTLY TREATING CLASSES OF TRAFFIC

BACKGROUND OF THE INVENTION

1. Field of the Invention

The present invention relates generally to a broadband communication system, and is more particularly related to classification of data traffic for transmission over a packet switched network.

2. Discussion of the Background

As society, in general, becomes increasingly reliant on communication networks to conduct a variety of activities, ranging from business transactions to personal entertainment, communication engineers continually face the challenges of optimizing network services and ensuring network availability to a diverse set of users with varying traffic requirements. Because service requirements of different users, for that matter of the same users, can fluctuate depending on time of day and applications, the accuracy of traffic forecasts is diminished. Inaccurate forecasts can lead to negative effects, such as traffic congestion, slow response times, or even loss of data. The maturity of electronic commerce and acceptance of the Internet as a daily tool by millions of users (this user base continues to grow) only intensifies the need to develop network services that can dynamically adapt to user needs. With the advances in processing power of desktop computers, the average user has grown accustomed to sophisticated multimedia applications, which place tremendous strain on network resources (e.g., switch capacity). Also, because the decrease in application response time is a direct result of the increased processor performance, the user has grown less tolerant of network delays, demanding comparable improvements in the network infrastructure. Therefore, efficient use of network capacity is imperative, particularly in systems where capacity needs to be managed carefully, such as a satellite network.

Satellite communications systems have emerged as an accessible and reliable network infrastructure that can support the exchange of voice, video, and data traffic. Conventionally, these satellite communications systems offer dedicated communication channels that relay or tunnel traffic without processing such traffic (i.e., "bent pipe"). That is, the system has no knowledge of what types of protocols are used or data that is contained within the packets. One drawback with some of these satellite communications systems is that they are highly inefficient with respect to bandwidth allocation. For example, if the satellite has excess transponder bandwidth at a particular time, this excess capacity cannot be temporality reallocated to another satellite terminal (ST). Another drawback is that the latencies involved in satellite communications point towards special treatment of key networking functions, such as flow control and congestion controland how the system to adapts to the different types of traffic that are received at the STs.

Based on the foregoing, there is a clear need for improved approaches for processing of data traffic within the terminals of a satellite communications system.

There is also a need to enhance efficient utilization of the system capacity.

There is also a need to reduce response time associated with various applications.

Based on the need to improve system efficiency, an approach for classifying traffic for efficient transmission over a satellite network is highly desirable.

SUMMARY OF THE INVENTION

The present invention addresses the above stated needs by providing a capability within a satellite terminal to classify data packets into a transport service based on application or a prior arranged method of identifying packets. The transport service is mapped to a packet delivery service for efficient transmission of the packet based on further detail of the actual arrival pattern.

According to one aspect of the invention, a method of processing packets for transmission over a satellite communications network is disclosed. The method includes receiving a packet associated with an application from a host. The method also includes classifying the packet into one of a plurality of transport services based upon the corresponding application, and mapping the one transport service to one of a plurality of packet delivery services. The one packet delivery service provides transmission of the packet over the satellite communications network. Under this approach, the system throughput is enhanced.

According to another aspect of the invention, a terminal apparatus for transmitting packets over a satellite network is disclosed. The terminal apparatus includes a user interface that is configured to receive a packet associated with an application from a host. The terminal apparatus also includes a classification logic coupled to the user interface and configured to classify the packet into one of a plurality of transport services based upon the corresponding application. Further, the terminal apparatus includes a mapping logic that is configured to map the one transport service to one of a plurality of packet delivery services, wherein the one packet delivery service provides transmission of the packet over the satellite network. This arrangement advantageously provides an improvement in user response time.

According to another aspect of the invention, a terminal apparatus for transmitting packets over a satellite network is disclosed. The terminal apparatus includes means for receiving a packet associated with an application from a host, and means for classifying the packet into one of a plurality of transport services based upon the corresponding application, and means for mapping the one transport service to one of a plurality of packet delivery services. The one packet delivery service provides transmission of the packet over the satellite communications network. The above arrangement advantageously provides efficient utilization of bandwidth.

In another aspect of the invention, a communication system for transmitting packets over a satellite is disclosed. The system includes a satellite terminal that provides connectivity for a host. The satellite terminal includes a user interface that is configured to receive a packet associated with an application from a host, and classification logic that is coupled to the user interface and configured to classify the packet into one of a plurality of transport services based upon the corresponding application. The satellite terminal also includes a mapping logic that is configured to map the one transport service to one of a plurality of packet delivery services, wherein the one packet delivery service provides transmission of the packet to the satellite. The system also includes a hub that is configured to communicate with the satellite terminal over the satellite to provide the plurality of packet delivery services. The above arrangement advantageously enhances system throughput of data traffic.

In yet another aspect of the invention, a computer-readable medium carrying one or more sequences of one or more instructions for processing packets for transmission over a satellite communications network is disclosed. The one or more sequences of one or more instructions include instructions which, when executed by one or more processors, cause the one or more processors to perform the step of receiving a packet associated with an application from a host. Other steps include classifying the packet into one of a plurality of transport services based upon the corresponding application, and mapping the one transport service to one of a plurality of packet delivery services. The one packet delivery service provides transmission of the packet over the satellite communications network. This approach advantageously improves servicing of user traffic.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Although the present invention is described with respect to a satellite communications system that supports packet switching, it is recognized by one of ordinary skill in the art that the present invention has applicability to packet switching systems, in general.

Figure 1:
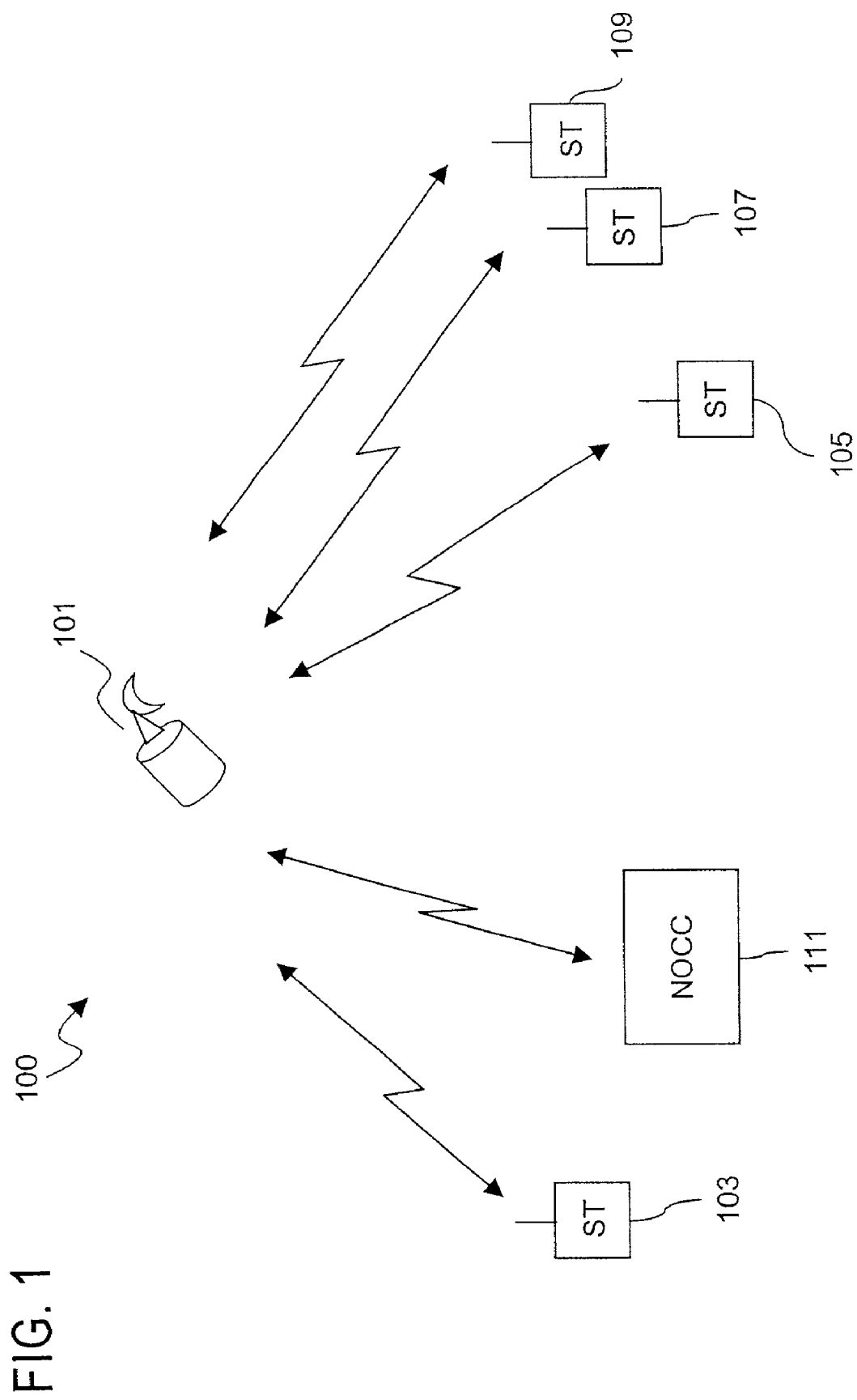
FIG. 1 is a block diagram of a satellite communications system supporting traffic classification, in accordance with an embodiment of the present invention.

FIG. 1 show a block diagram of a satellite communications system capable of supporting contention channels, in accordance with an embodiment of the present invention. A communication system 100 includes a satellite 101 that supports communication among satellite terminals (STs) 103, 105, 107, and 109. System 100 employs Network Operations Control Center (NOCC) 109 to manage and control communication services and operations. For example, the NOCC 109 provisions and identifies the channels that are to be used for the various packet delivery services, which are supported by the system 100. These packet delivery services are more fully described below.

In an exemplary embodiment, the STs 103, 105, 107, and 109 are Very Small Aperture (VSAT) terminals. Under this architecture, users can communicate from one VSAT ST to another directly with one satellite hop. That is, the system 100 provides mesh connectivity. According to one embodiment of the present invention, system 100 possesses a centralized reservation mechanism for providing bandwidth on demand (BoD). Because BoD request rate may be limited, the present invention act to offload the centralized reservation mechanism by handling low data rate flows.

Unlike conventional bent-pipe satellite systems, satellite 101 demodulates fixed-length packets that are received from STs on uplink spot beams, queues the packets for the proper downlink destination based on packet header information, and then modulates the packets for transmission on the specified downlink spot beam. Satellite 101 employs spot beams and possesses processing functions that permit greater power and spectral efficiency than traditional bent-pipe satellites. Further, satellite 101 can replicate individual packets that are received on the uplink and send these packets to multiple downlink spot beam destinations. In this manner, satellite 101 can retain broad distribution capabilities of the bent-pipe satellite systems, while providing flexibility in terms of bandwidth allocations.

Satellite 101 contains a fast packet switch (FPS) (not shown) to process data packets that are exchanged across system 100. Exemplary switches include an ATM (Asynchronous Transfer Mode) switch, and a Gigabit Ethernet switch; it is recognized by one of ordinary skill in the art that any type of switch can be utilized. The FPS transfers the packets that the payload of the satellite 101 receives on the uplinks to the proper downlinks. The payloads of satellite 101 may include other components, such as uplink antenna, down-converters, switch matrix, demodulator banks, and phased-array downlink antenna; these other components are well known, and thus, are not described in detail.

The satellite 101 performs the necessary bandwidth control functions, in conjunction with the Network Operations Control Center (NOCC) 111 (i.e., a hub). In system 100, STs 103, 105, 107, and 109 originate traffic from a particular coverage area and may transmit connectionless traffic as well as connection-oriented traffic. The generated traffic from these STs 103, 105, 107, and 109 are transferred through switch and terminate at destination STs (not shown) within the same and/or different coverage area. That is, the destination STs can be within the same coverage area as the originating STs. To effectively transmit traffic to the desired destination ST through the switch of the satellite 101, STs 103, 105, 107, and 109 transmit bandwidth requests to the satellite 101 prior to transmitting any data traffic.

A connection that is established between a source ST and a destination ST is controlled by the satellite 101 and the NOCC 111. The NOCC 111, which is based on the ground, provides management functions for the system 100. For example, an ST needs to obtain authorization from the NOCC 111 before making a request to the satellite 101. The NOCC 111 keeps track of the total uplink (and downlink) bandwidth available for connections and will block a connection request if there is insufficient satellite capacity available to satisfy the request.

The satellite 101 implements the bandwidth control function, which includes controlling the allocation of uplink channels and timeslots and mitigating downlink congestion.

Satellite 101 examines the requested bandwidth and replies with grants based on downlink resource availability, as determined by a congestion avoidance logic (not shown) and uplink resource availability. The congestion avoidance logic regulates the amount of traffic received by the switch through, for example, TDMA (Time Division Multiple Access)/FDMA (Frequency Division Multiple Access) uplink channels via request/grant bandwidth control processes.

According to one embodiment of the present invention, two types of requests are defined: rate requests, and volume requests. As will be detailed later, these requests are delivery services in support of transport services. In general, rate requests are utilized for connection-oriented traffic, while volume requests are used to transmit bursty traffic. The present invention has particular application to volume requests. STs 103, 105, 107, and 109, in general, can submit rate requests as well as volume requests, depending on the mode of operation (i.e., the type of traffic the ST is processing). Rate requests specify the number of slots in each uplink frame that an ST (e.g. 103) needs to meet the uplink demands for a relatively constant traffic (e.g., connection-oriented). A rate request results in the allocation of a constant number of slots each frame, spread out as evenly in time as possible, which the ST (e.g. 103) can use to send packets at a constant rate. The requesting ST (e.g. 103) gets a constant allocation of that uplink capacity every frame until the request is cancelled by the ST (e.g. 103) via a de-allocation message to the satellite.

Volume requests specify the number of uplink slots that an ST (e.g. 103) requires to send a specific number of packets to another ST (e.g. 103). The requesting ST (e.g. 103) receives a periodic allocation of one or many slots within a specific frame until the entire number of slots requested has been allocated. Volume requests are used by the ST (e.g. 103) to send a burst (one or many) of data packets on the uplink. Several volume requests may be transmitted by the ST (e.g. 103) in a short period of time to send a file that has hundreds of data packets (e.g., segmented IP (Internet Protocol) packets) to another ST (e.g. 105, 107, and 109).

The bandwidth request operation is performed by an ST (e.g. 103) that transmits data using a rate request during one session and a volume request during another session. A satellite terminal transmits a bandwidth request message to the satellite over a contention channel. Based on the current traffic load, the satellite 101 may dynamically assign some of the uplink channels on a frame-by-frame basis to change the designation of these uplink channels from data channels to contention channels. Thus, when the traffic on the data channels is light, the satellite 101 can assign most of the data channels to be used as contention channels, thereby reducing the collision rate for contention accesses by the STs. In other words, as traffic on data channels increases, the satellite 101 can change contention channels into data channels, as appropriate. This advantageously permits a more efficient use of satellite capacity, in that as the load increases, fewer channels are dedicated to receiving new bandwidth request messages.

Upon receiving the bandwidth request message and after determining that bandwidth is available, the satellite 101 sends a rate allocation every frame to provide the ST (e.g. 103) with a fixed number of time slots that the ST (e.g. 103) can transmit into that frame. Specifically, the satellite 101 allocates uplink slots in response to bandwidth requests from STs in each uplink beam once every frame and sends rate allocations to the STs in these downlink cells once per frame using allocation messages. Sending rate allocations every frame allows the satellite 101 to move rate allocation slots within a channel or to another channel to "defragment" the rate allocations.

According to one embodiment, the satellite 101 packs allocations for several STs into each allocation message to preserve downlink bandwidth. The satellite 101 addresses allocation messages to a dedicated multicast group address so that these packets can be processed by all of the STs in the uplink cell that are waiting for slot allocations. These STs process every allocation message that they receive to find the ones that contain their own destination addresses and their corresponding allocations.

Rate requests, according to an embodiment of the present invention, are acknowledged by the satellite 101 in one of two ways, rate allocation within an allocation message or rate denied within an acknowledgement message. As used herein, the term assignment messages refer to both allocation messages and acknowledgement messages; an acknowledgement message effectively is a denial of the request (i.e., no slots have been allocated). If an ST (e.g. 103) receives a request denied response to a rate request, the ST (e.g. 103) notifies the NOCC 111, which then determines the course of action. Rate requests are de-allocated (released) by the ST (e.g. 103) when the ST (e.g. 103) has completed its transmission. Rate de-allocated messages from the ST (e.g. 103) are not acknowledged by the satellite 101. The ST (e.g. 103) monitors the multicast allocation message from the satellite 101 to determine that the rate was de-allocated. The NOCC 111 can also de-allocate a rate request for an ST (e.g. 103).

The size of rate requests can be increased or decreased by sending a rate change request specifying a different number of slots per frame. The change request is sent using an allocation from the original rate request. If the rate change is granted, the ST (e.g. 103) receives an allocation for the new rate within a multicast allocation message. If the rate change is denied, the ST (e.g. 103) receives a multicast acknowledgement message indicating the denial. The satellite 101 does not de-allocate the original rate request until the satellite 101 has successfully processed and allocated the changed rate request.

An ST (e.g. 103) that does not receive a multicast packet with its allocation (due to a rain fade, etc.) cannot transmit. The ST (e.g. 103) must wait until a multicast is received that specifies the allocation to resume transmission.

Successive rate allocations provide the ST (e.g. 103) with the same number of time slots in a frame; however, the channel and slot locations for that allocation may be changed. Upon receiving the rate allocation, the ST (e.g. 103) can begin transmitting data. Thus, an ST (e.g. 103) may send a packet burst into a timeslot on a data channel only if the ST (e.g. 103) has sent a request message to the satellite 101 and has received an allocation from the satellite 101 authorizing the ST (e.g. 103) use of specific timeslots on a particular channel. It should be noted that the data channels experience no collisions because the satellite 101 only allocates a timeslot on a data channels to a single ST (e.g. 103). The rate allocation remains until the ST (e.g. 103) sends a bandwidth release packet. Initial bandwidth requests for a rate allocation are typically sent on a contention channel. However, the release packet, which de-allocates a rate, can be sent within the rate allocation that is being de-allocated.

Figure 2:
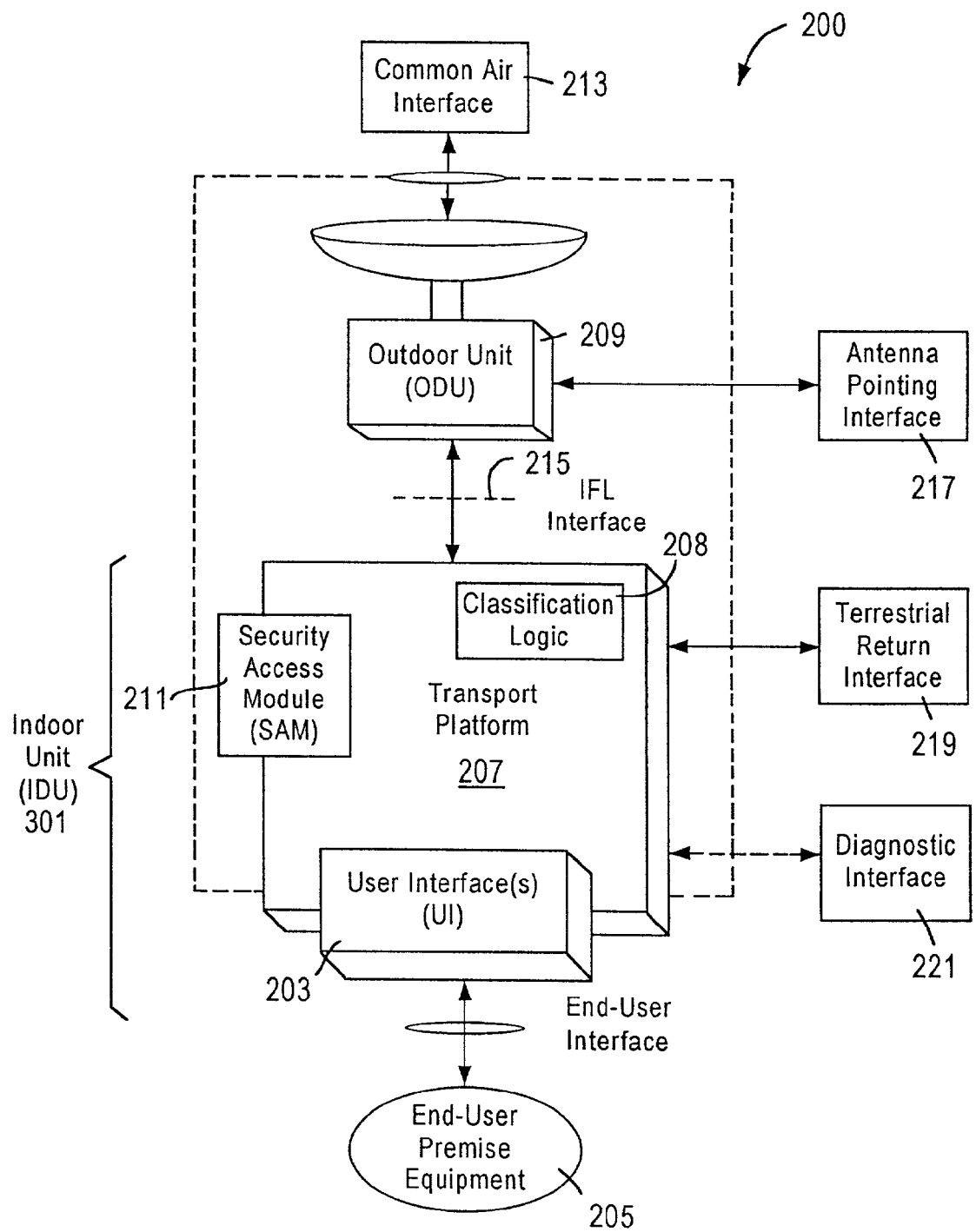
FIG. 2 is a block diagram of a Satellite Terminal (ST) utilized in the system of FIG. 1.

FIG. 2 shows a block diagram of a Satellite Terminal (ST) utilized in the system of FIG. 1. The ST 200 includes the following components: an Indoor Unit (IDU) 201, an Outdoor Unit (ODU) 209, a Security Access Module (SAM) 211, and User Interface (UI) 203. As used herein, the terms "user interface" and "user network interface" are used synonymously. In an exemplary embodiment, the IDU 201 unit is installed indoors and may include such components (not shown) as an uplink modulator, downlink demodulator, data packet handler, terminal control subsystem, power supply and chassis. The ODU 209, which is installed outdoors, includes a small antenna, antenna feed, RF transmitter, high power amplifier (HPA), and IF (Intermediate Frequency) conversion functions.

ST 200 has a layered functional architecture, which includes two functional elements: a core Transport Platform (TP) 207 and one or more application specific User Interfaces (UI) 203. The TP 207 is the functional element that provides the basic communications services including the physical, network and management layers. Notably, TP 207 utilizes a classification logic 208, which classifies received data packets (i.e., data traffic) into various predefined transport services: constant rate transport service, constant rate with burst transport service, priority burst (high or normal) transport service, and low volume low latency (LVLL) transport service. This classification process enables a more efficient treatment of data packets by classifying the data traffic based upon the particular application that originated the data packet. In this manner, the terminal 200 optimizes the use of bandwidth of system 100. The classification logic 208 is more fully described below with respect to FIG. 3.

The TP 207 is generic in the sense that diverse end user applications can be accommodated without change to the TP 207. The UI 203 is the functional element that provides the interface between the TP 207 and an end user equipment 205. The UI unit 203 provides the user interface and adaptation function that allows users to connect the End-User premise equipment 205 to the system 100. The UI 203 may be implemented as a plug in module or be built into the IDU 201, depending on the ST type. Thus, the UI 203 provides any adaptation necessary such that the end user applications can be communicated over system 100.

The SAM unit 211 provides security functions, including authentication, network access control, key management and network signaling encryption. In an exemplary embodiment, the SAM 211 is a replaceable module that is installed as part of the IDU 201.

Further, ST 200 has a number of interfaces: a Common Air Interface (CAI) 213, an Inter-Facility Link (IFL) 215, an Antenna Pointing Interface 217, a Terrestrial Return Interface 219, a Diagnostic Interface 221, and UI 203. ST 200 complies with the common air interface 213, which includes all aspects of the physical, link, network and management layers that defines the interface between the ST 200 and the system 100. The inter facility link (IFL) 215 is an internal interface that connects the IDU 201 and ODU 209. The IFL 215, according to an exemplary embodiment, consists of standard coaxial cables.

The user interface 203 defines the nature of a specific application process and the manner by which the application is adapted to system 100. According to an embodiment of the present invention, the UI 203 is an Ethernet interface (e.g., 10BaseT, 100BaseT, etc.). It is recognized by one of ordinary skill in the art that any number of user interfaces may be utilized.

The antenna pointing interface 217 permits the end-user to steer the antenna towards satellite 101 to obtain proper signal strength. That is, the ST 200 provides an indicator that is accessible at the ODU 209 for use in pointing the antenna to the proper satellite 101. The pointing indicator provides feedback that reflects the relative received signal quality; the antenna position is adjusted until the peak signal quality is achieved.

Via the Terrestrial Return Interface 219, ST 200 supports a terrestrial return capability for terminals that do not have satellite transmission capability. This interface 219 may use, for example, an internal dial-up modem that supports various data rates (e.g., up to 56 kbps), along with the necessary interface logic to connect to a public switched telephone network (PSTN).

Diagnostic interface 221 is used for field service application, such as, testing by the field technician. The end-user does not have access to this interface 221, which is protected against unauthorized usage. This interface 221, in an exemplary embodiment, may be an asynchronous serial port, which may support a variety of data rates (e.g., 19.2 kbps).

ST 200 may be implemented according to many different ST types, based upon the particular application: End-User Satellite Terminals (ESTs), Network Satellite Terminals (NSTs), and System Satellite Terminals (SSTs). ESTs are complete terminals with all the necessary interworking functions to interface with End-User Premises Equipment 205 (e.g., an individual personal computer or a business local area network (LAN)). STs may also be NSTs, which are complete terminals with all the necessary interworking functions to interface with the network infrastructure of, for instance, an enterprise customer (e.g. network access nodes for Internet backbone), as discussed in FIG. 1. NSTs are well suited to large businesses, corporate headquarters, and Internet Services Provider (ISP) applications. The NOCC 111 also uses SSTs for internal network operations and management. As used herein, the term "ST" refers to any one of the above ST types.

Figure 3:
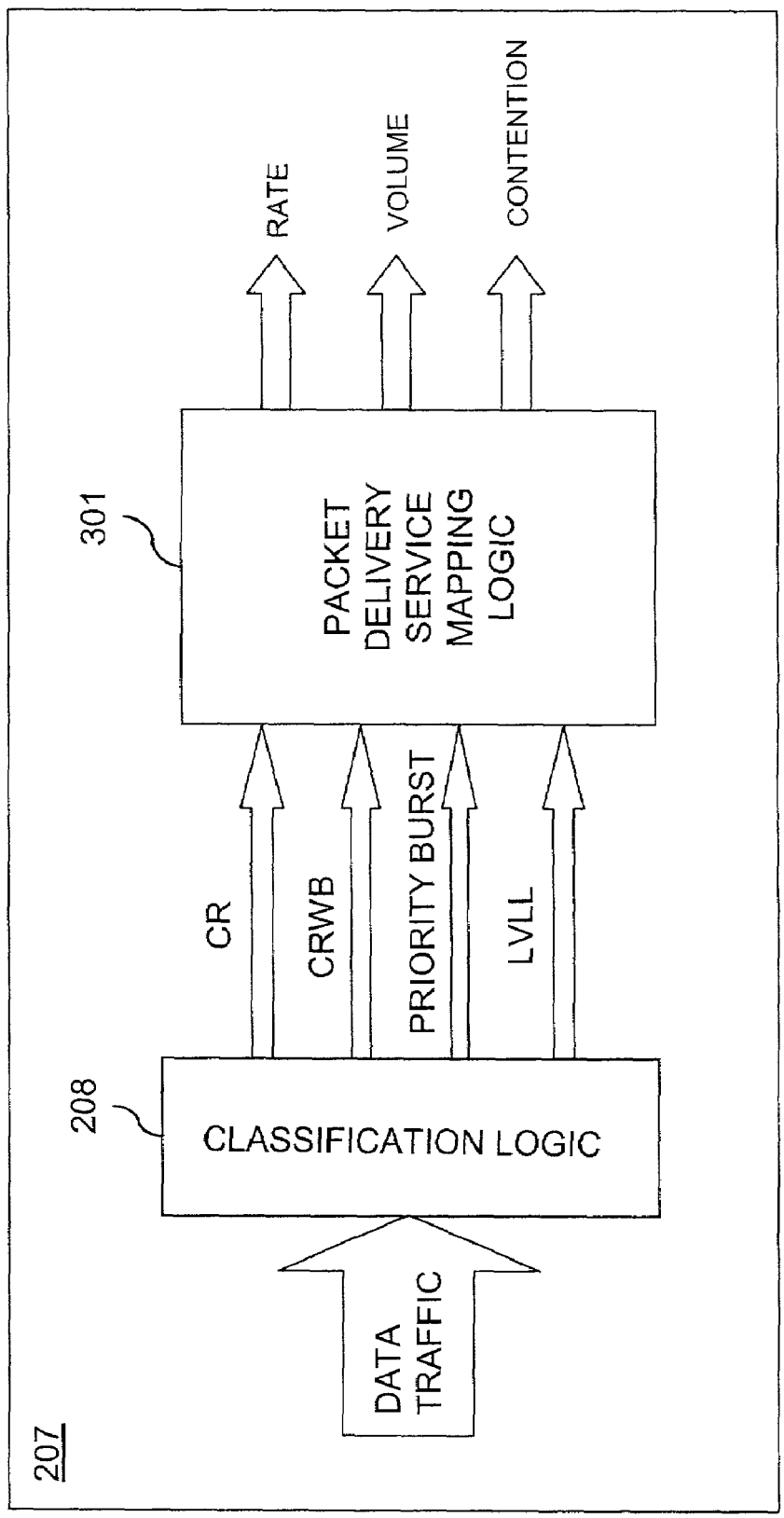
FIG. 3 is a diagram of the functional relationship among transport services and packet delivery services, according to an exemplary embodiment of the present invention.

FIG. 3 shows a diagram of the functional relationship among transport services and packet delivery services, according to an exemplary embodiment of the present invention. TP 207 includes classification logic 208 and a packet delivery service mapping logic 301. As previously mentioned, the classification logic 208 effectively maps user data traffic to transport services that correspond to the particular applications associated with the data traffic.

Classification rules, as executed by classification logic 208, are used to map IP flows to transport services, which characterized by performance expectations, such as loss and latency levels, that system 100 offers to end users. In the default configuration, classification rules set up the system 100 transport architectures that support the end user applications. According to one embodiment of the present invention, three transport architectures are utilized in system 100: bulk transport, messaging transport and real-time transport. It is noted that classification to one of these transport architectures can be performed using IETF (Internet Engineering Task Force)-defined QoS (quality of service) or customer-defined specifications; alternatively, these specifications may not be required.

As a general rule, Constant Rate (CR) and Constant Rate With Burst (CRWB) transport services are used for real-time traffic (e.g., video teleconferencing applications). High Priority Burst (HPB) and Normal Priority Burst (NPB) transport services are used for bulk traffic (as is CRWB on occasions) and some messaging. Low Volume Low Latency (LVLL) is used for small messaging and short bursts, such as point-of-sale (POS) transactions.

The above transport services (e.g., CR, CRWB, priority burst, and contention) may be classified based upon a number of parameters, which include source address, destination address, destination port, and ToS (IP Type of Service of IPv4)—as seen in Table 1, below. That is, the classification may be performed on a per-user-port basis, and the transport services may be configured in the following operational modes: a general mode and a differentiated service (DiffServ) mode. In DiffServ-only mode, a default rule may involve dropping any incoming packet that is not marked to a DiffServ code point that is explicitly recognized by the classification logic 208. Classification logic 208 offers the identification of real time flows by unique UDP (User Datagram Protocol) destination port numbers. As a result, the unique port numbers can be mapped to a transport service that addresses the applications specific bandwidth needs. For multimedia applications, for instance, the H.323 protocol permits modes of operation in which these port numbers are dynamically determined. In addition, classification logic 208 may identify real-time flows by using the (non-dynamically assigned) IP source address of a videophone.

Because real-time flows arrive dynamically, it is necessary for the ST 200 to dynamically configure a CR or CRWB servicing rate. In this scenario, the (real-time) applications used by the customers are known in advance, and transport service to support them can be pre-provisioned. This transport service and the classification rules are the flows defined in the on-demand classification rules. However, it is not realistic to have the transport service consume uplink capacity when the application is not active. The classification rules may be altered by NOCC 111 based on input from the customer.

The NOCC 111 supports the ability for customers to specify the precedence with which the ST 200 is to apply classification rules; the NOCC 111 may then install all classification rules in the ST 200 in the order of the specified precedence. With respect to mapping flows to transport services, classification logic 208 of ST 200 map IP data flows received at the UI 203 (e.g., LAN interface) to transport service as defined by the classification rules. In an exemplary embodiment, precedence is implied by the order in which the rules are configured by the NOCC 111.

If configured in DiffServ mode, the ST 200 attempts to map IP packets arriving at an ST User port to a transport service using the correct 6-bits of either the ToS (IPv4) or the "flow" field (IPv6) according to up to 7 DiffServ codepoints configured by the NOCC 111. If not configured in DiffServ-only mode, the ST 200 maps an IP packet arriving at an ST User port to a transport service using configured rules based on at least the fields and limitations that are enumerated in Table 1.

TABLE 1

| SOURCE FOR TRAFFIC CLASSIFICATION | RULES |
|---|---|
| Source IP address | Up to six rules |
| Destination IP address or the IP multicast range | Up to six rules |
| Destination UDP/TCP port number | Up to ten rules, applicable only if IP packet is not ESP protected |
| Source UDP/TCP port number | Up to six rules, applicable only if IP packet is not ESP protected |
| Combination of source IP network and destination UDP/TCP port number ranges | Up to 18 total rules: up to 3 source IP sub-networks for each of up to 6 destination UDP/TCP port number ranges; applicable only if IP packet is not ESP protected |

If all attempts to map the IP packet to a transport service based on classification rules are unsuccessful, the ST 200 map an IP packet arriving at an ST port to a configured default transport service.

If an IP packet has been mapped to a CR or CRWB transport service, the ST 200 may use destination address and transport service to assign the IP packet to a collection of setup connections when available, and when no connections are available, either drop the IP packet or forwarded it via a configured burst based transport service, selectable based on configuration. The ST 200 may request the establishment of a connection for a CR or CRWB transport service (by means of connection management) when data flows defined in the "on-demand-dial" classification rules appears at the ST 200.

The classification rules also allow access to system 100 services by means of DiffServ or customer-defined criteria. Through these means, it is possible to map any specific customer applications to a specific transport service without regard to the generalized mappings suggested above.

Multiple instances of CRWB, HPB, and NPB transport service may be defined, allowing for relative service weightings to be configured between the instances. This allows the customer greater control in managing the user traffic at the access point into system 100. In addition, multiple instances of CRWB allow different applications within an ST 200 that use this transport service to be differentiated as to maximum burst size allowed and threshold for triggering a volume requests.

Figure 4:
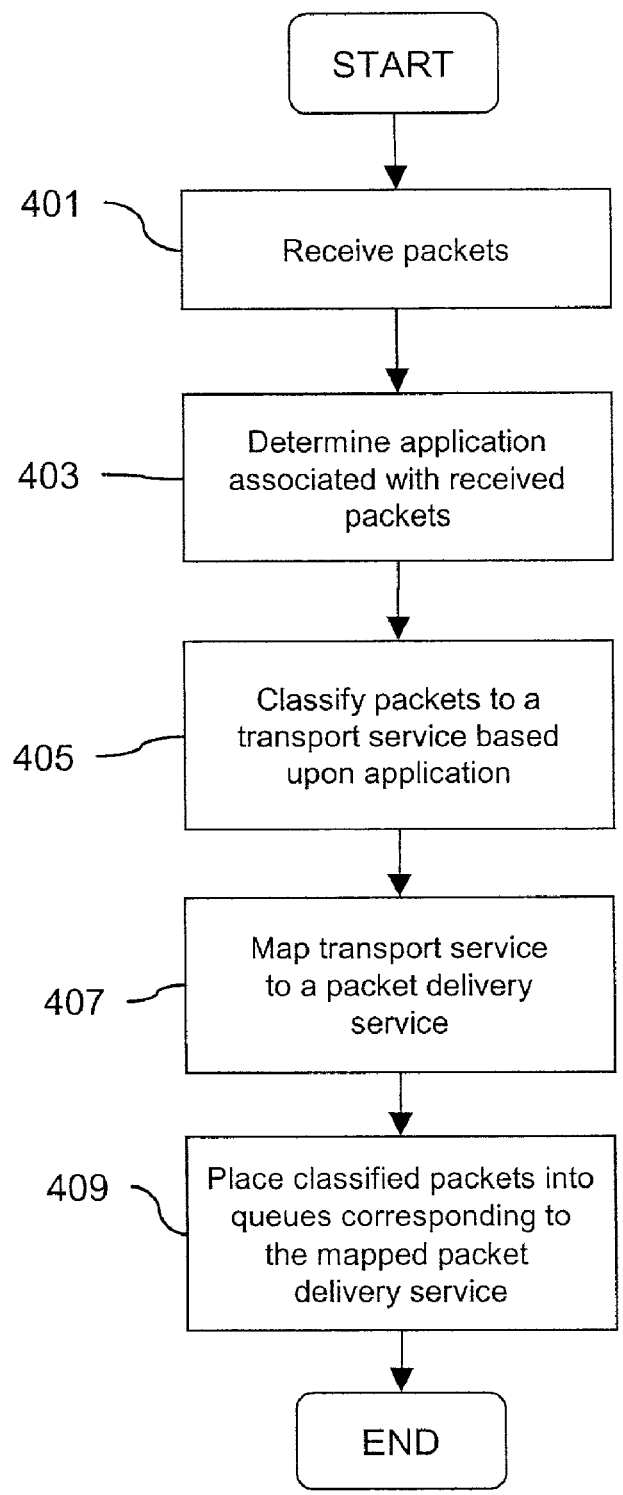
FIG. 4 is a flowchart of a traffic classification process, in accordance with an embodiment of the present invention.

FIG. 4 shows a flowchart of a traffic classification process, in accordance with an embodiment of the present invention. ST 200 may serve one or more hosts (i.e., client stations) that run a variety of applications. These applications may have varying data rate requirements. For example, a host may be engaged in a video application (e.g., streaming video and video teleconferencing) or voice application (e.g., IP telephony), both of which require constant data rate services. On the other hand, another host may be engaged in web-browsing, in which case the traffic pattern is bursty. Further, if a host is a point-of-sale (POS) terminal, the data rate requirement is low; however, network latency should be minimized as financial transactions are time sensitive. To optimize the processing of these potentially diverse applications, ST 200 employs a classification logic 208 and a mapping logic 301 to tailor the forwarding of data traffic that are originated from the hosts.

In step 401, data packets are received by the ST 200 via one or more user interfaces 203. Next, the application associated with the received packets are determined by the classification logic 208, per step 403. Based upon the particular application, the classification logic 208, as in step 405, classifies the packets to a transport service. Thereafter, mapping logic 301 maps the transport service to a packet delivery service (step 407). In step 409, the classified packets are placed into queues that correspond to the mapped packet delivery service; the manipulation of these queues are further described in FIG. 8.

Figure 5:
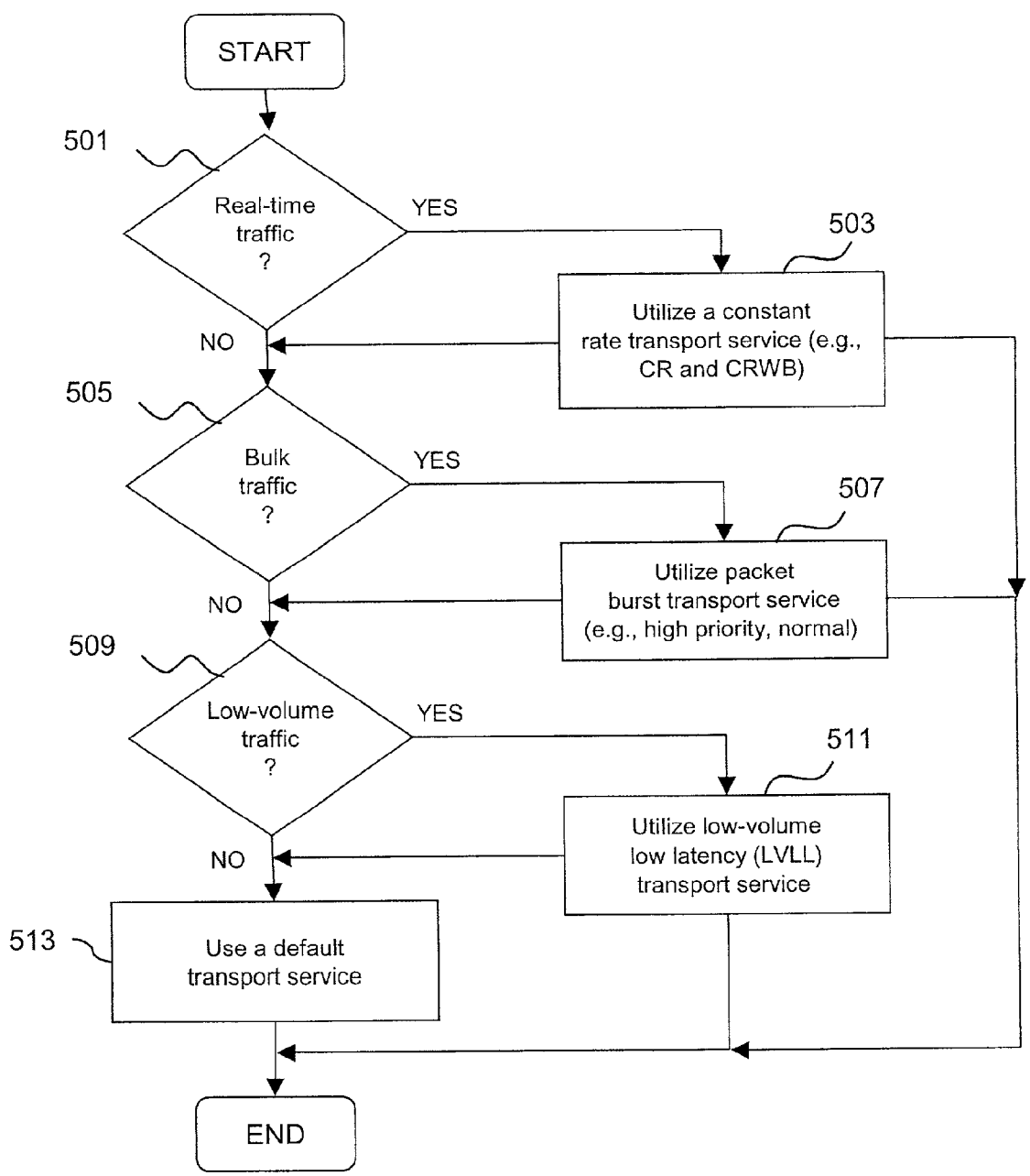
FIG. 5 is a flowchart of the process of classifying packets into transport services in the process of traffic classification of FIG. 4.

FIG. 5 shows a flowchart of the process of classifying packets into transport services in the process of traffic classification of FIG. 4. In an exemplary embodiment, the end-user applications data traffic may be categorized based upon determining whether the received data traffic is real-time traffic, bulk traffic, or low-volume traffic. In step 501, classification logic 208 checks whether the data packets constitute real-time traffic; if so, a constant rate transport service (e.g., CR and CRWB) is utilized (per step 503). Classification logic 208 also determines whether the data packets are associated with bulk traffic, as in step 505. Under this scenario, bulk traffic, as in step 507, is mapped to a packet burst transport service, which may be either high priority or normal. If the receive data packets are not identified as bulk traffic, then classification logic 208 determines whether the application corresponds to low-volume traffic, per step 509. The LVLL transport service, as in step 511, is employed if the data packets are associated with an application that sources low-volume traffic. In the event that classification logic 208 does not identify the data traffic as real-time traffic, bulk traffic, or low-volume traffic, then a default transport service may be utilized (step 513). Although steps 501, 505, and 509, are described as a sequential process, it is recognized that these steps may be executed out of sequence and/or in parallel by classification logic 208 of ST 200.

Upon classifying the data traffic to a transport service, ST 200 subsequently maps the transport service to a packet delivery service among multiple packet delivery services that are supported by system 100.

Figure 6A:
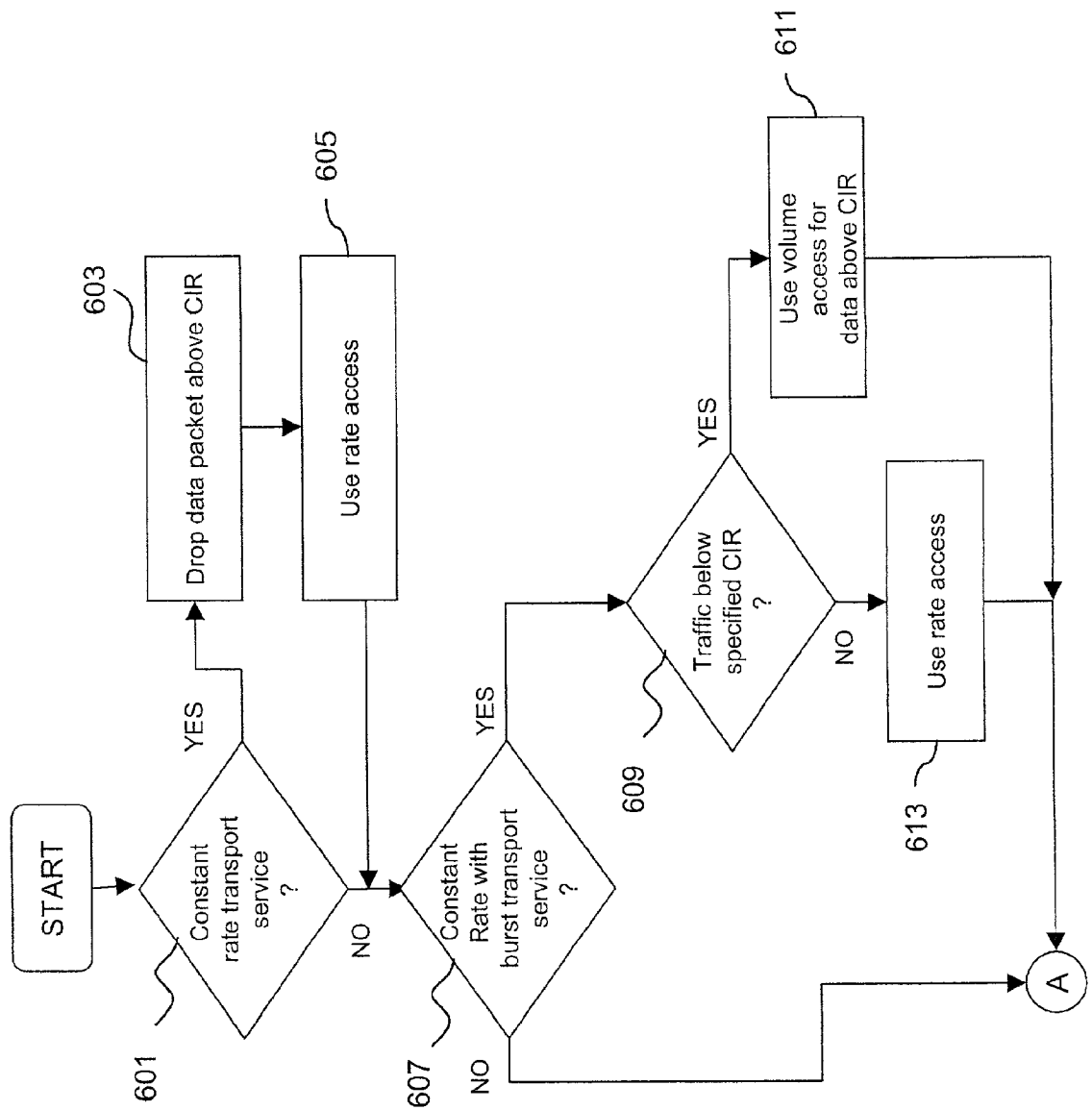
FIGS. 6A and 6B are a flowchart of the process of mapping transport services into packet delivery services in the traffic classification process of FIG. 4.
Figure 6B:
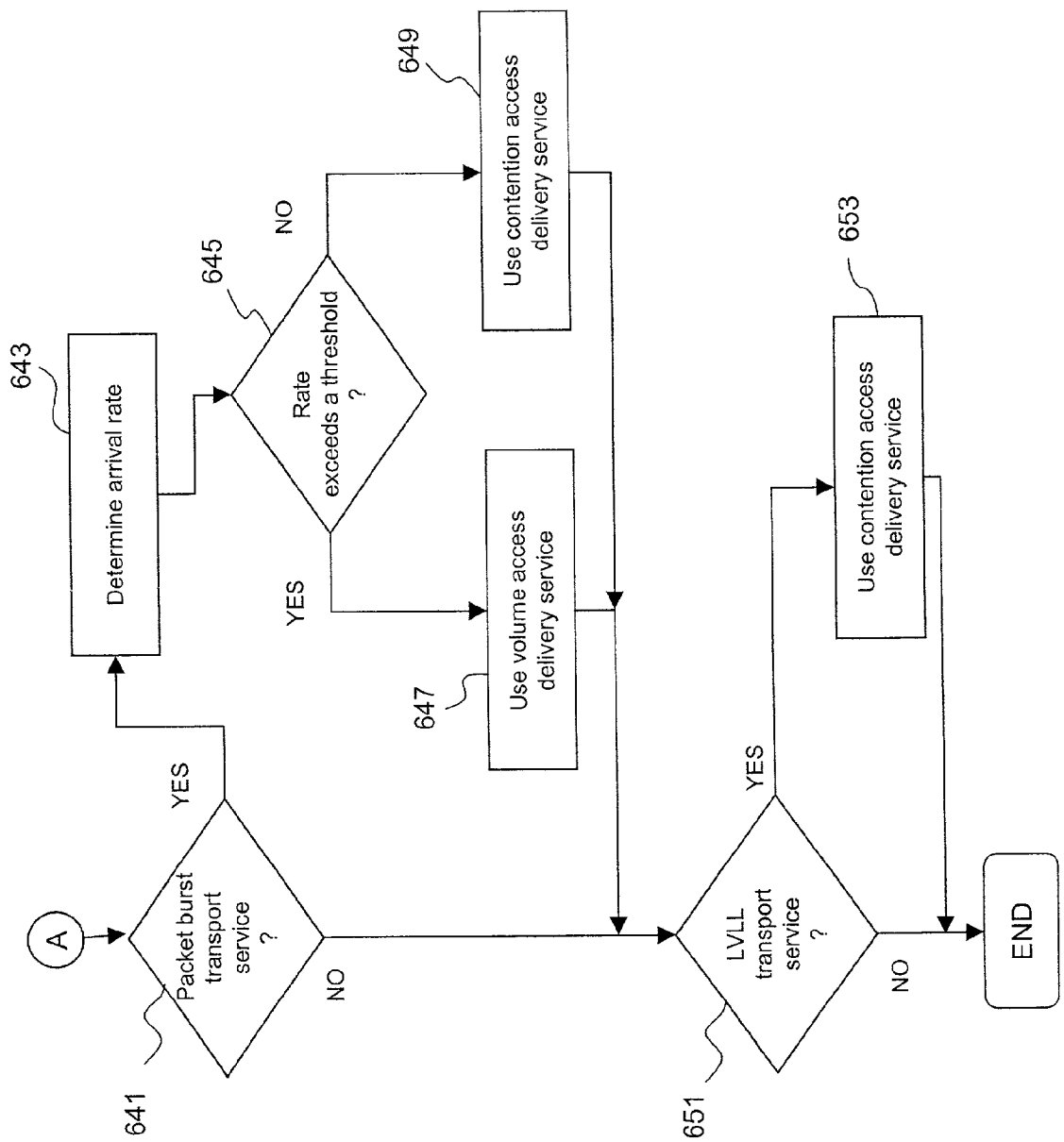

FIGS. 6A and 6B are a flowchart of the process of mapping transport services into packet delivery services in the traffic classification process of FIG. 4. If classification logic 208 maps the received data traffic to a constant rate transport service (e.g., CR and CRWB) as in step 601, then data packets above a committed information rate (CIR) is dropped (per step 603). The CIR, in an exemplary embodiment, may be measured by a leaky bucket profile. Rate access is used, as in step 605, on the transmission channel from the ST 200 to the satellite 101 (i.e., uplink (UL)); and this traffic can be point-to-point, replicated multicast, or broadcast. As long as flow is under CIR, flows to different downlink (DL) regions do not need to be enqueued separately, since this traffic was completely pre-provisioned by the NOCC 111. The opposite holds true for all other transport service.

In step 607, if the ST 200 utilizes a CRWB transport service, then the traffic below the specified CIR, as determined in step 609, triggers rate scheduling on the UL. Thus, data above CIR triggers volume usage, up to a maximum burst size (step 611). The above-CIR portion is marked with a degraded drop precedence. This service class may send point to point or broadcast. For the portion of traffic below the CIR, rate access is used (step 613).

In step 641, if the classification logic 208 maps the application to a packet burst transport service (i.e., HPB and NPB transport services), then the arrival rate of the packets are determined, per step 643. In an exemplary embodiment, the arrival rate is measured by a leaky bucket profile. If the rate exceeds a predetermined threshold, as in step 645, then the volume access packet delivery service is utilized; otherwise, the packets may be forwarded using contention access delivery service. The volume access packet delivery service is characterized by a cycle of making HPV or LPV BoD requests and receiving BoD grants in response. It is noted that internal messages and LVLL data can preempt volume slots that were earmarked for this service. Under limited circumstances, one HPB or NPB queue may be configured to use contention access, such as PA (Persistent Aloha), rather than HPV/LPV. This service class may send point-to-point or broadcast.

For a LVLL transport service, as determined in step 651, the application can be mapped to a contention access delivery service mechanism, per step 653. In addition, this data may preempt volume slots that were granted by the BoD and may backfill unused rate slots. High volume uplink usage is included in this category with the caveat that BoD requests/grants are bypassed.

Figure 7:
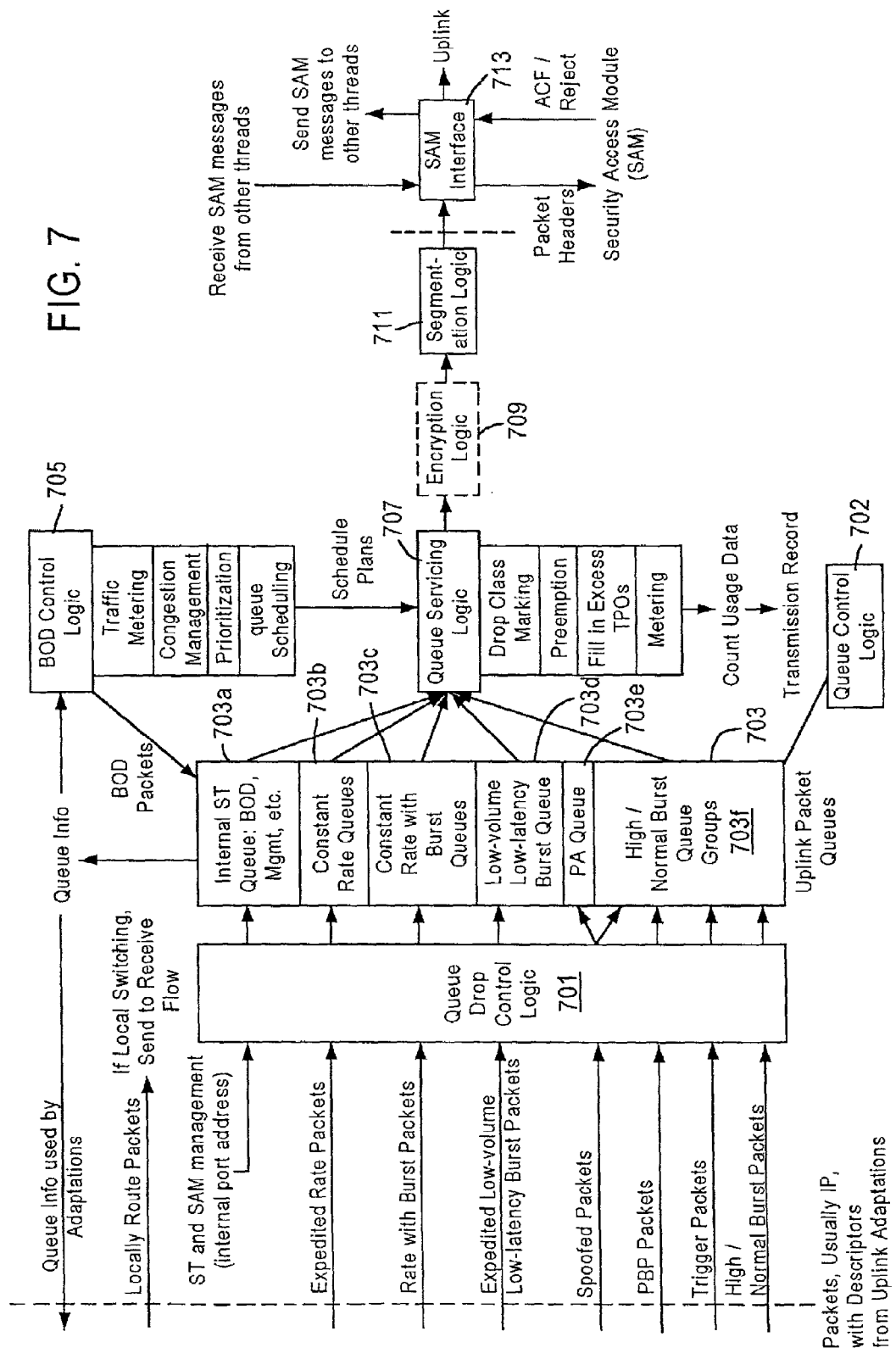
FIG. 7 is a diagram of the transport platform of the ST of FIG. 2.

FIG. 7 shows a diagram of the transport platform of the ST of FIG. 2. TP 307 of ST 200 forwards packets to satellite 101 using an uplink packet thread. This thread is performed by a queue drop control logic 701, which filters out packets based on various policies and transmits other packets to a set of uplink packet queues 703. The management of these queues 703 is controlled by queue control logic 702 and more fully described with respect to FIG. 8.

A Bandwidth-on-Demand (BoD) control logic 705 performs traffic metering, congestion management, prioritization, and queue scheduling to send BoD packets to the queues 703. The BoD control logic 705 also outputs schedule plans to a queue servicing logic 707. Queue servicing logic 707 executes the following functions: drop class marking, preemption, fill-in, and metering. The output of the servicing logic 707 may be encrypted via an encryption logic 709, which in turn, provides encrypted packets to a segmentation logic 711. The segmentation logic 711 may segment the encrypted packets into packets of a prescribed format. These formatted packets are then supplied to a SAM interface 713.

In providing user data transport services, ST 200 manages the set of queues 703 such that at any point in time, each service is mapped to a single queue or a group of queues 703; these queues 703 may be logical in form of a linked-list structure. According to one embodiment of the present invention, the queues 703 include the following queues: an Internal ST queue 703a for storing BoD packets, control packets, and management packets; a Constant Rate (CR) queue 703b; a Constant Rate with Burst (CRWB) queue 703c; a Low-volume Low-latency Burst queue 703d; Persistent Aloha (PA) queue 703e, and a Normal Burst queue 703f. For High Priority/Normal Priority Burst (HP/NPB) services and Low-volume Low-latency Burst (LVLLB) service, the mapping is based upon configuration by the NOCC 111. For Constant Rate and Constant Rate with Burst services, the mapping is based upon the Connection Management requesting instances of these services for each connection.

For the volume-based User Data Transport Services, the system design requires the ST to give separate treatment to packets destined to each downlink region, primarily to support the congestion control mechanisms and to control traffic to premium, highly-utilized destinations. Whenever a volume-based service sends packets to multiple downlink regions, the service is mapped to a group of queues.

The set of one or more queues used to support a User Data Transport Service is termed a "Service Queue Group." All of the queues in a queue group use the same configuration and control parameters of the service, differing only by destination.

The Address Resolution and Classification functions map packets to a user service instance (identifying the Service Queue Group), destination downlink region, and connection number, which are used to select a specific queue. For the CR and CRWB services, the connection number is used to map to a specific queue 703 within the service instance. For the Normal/High Priority Burst (N/HPB) services, the downlink region is used to map to a specific queue 703 within the service instance.

To meet the system requirements, ST 200 maintains separate queues 703 for each service instance. Thus, the total number of queues 703 is the quantity of separate queues 703 multiplied by the number of downlink regions that the ST 200 makes BoD requests to or has connections to. The best QOS is achieved if each connection and service instance has its own queue, providing no interference, in-order delivery, and individual traffic shaping. In view of the above considerations, according to one embodiment of the present invention, ST 200 uses a separate queue for each connection for Constant Rate service. Likewise, for the Constant Rate with Burst services, ST 200 utilizes a separate queue for each connection. Each of the 7 instances of Normal/High Priority Burst service uses a group of queues; one for each destination downlink region. The Low-volume Low-latency Burst service uses a single queue. The number of downlink regions supported by ST 200 is a sizing parameter based on ST type.

ST 200 also supports burst services for carrying internally-sourced messages. These messages include bandwidth requests, address resolution requests, and all management messages to the NOCC 111. According to one embodiment of the present invention, ST supports the following internal queues: a BOD/HVUL (Bandwidth-on-demand/High Volume) request queue; a power control message queue; a calibration message queue; a signaling message queue; and a normal management message queue. It is recognized that other internal queues may be added, depending on the particular implementation of system 100.

Figure 8:
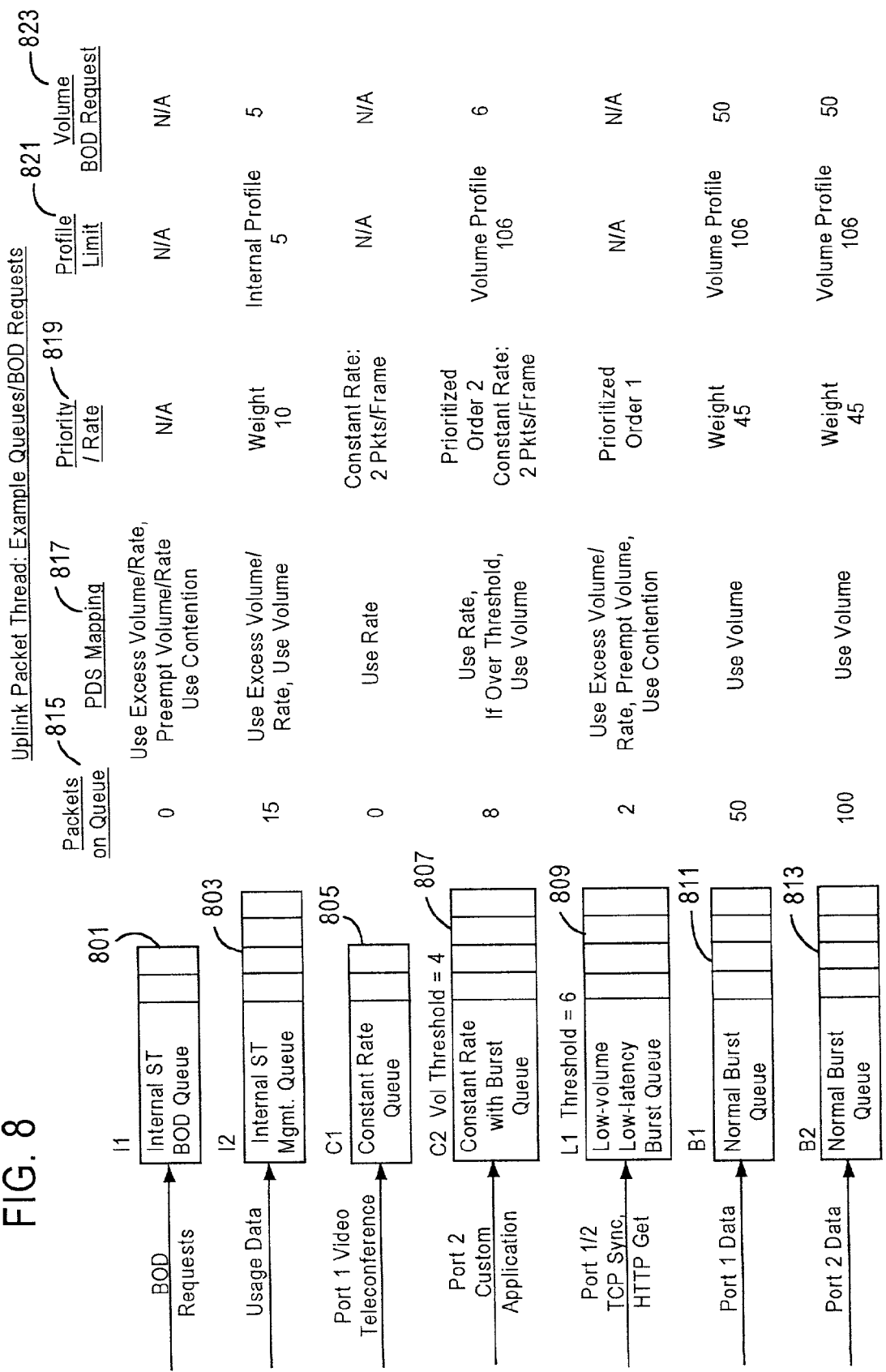
FIG. 8 is a diagram of exemplary queues within an ST to effect mapping of transport services to packet delivery services, according to an embodiment of the present invention.

FIG. 8 shows a diagram of exemplary queues within an ST to effect mapping of transport services to packet delivery services, according to an embodiment of the present invention. In this example, ST 200 utilizes an Internal ST BoD queue 801 for storing BoD request packets. An Internal Management queue 803 stores usage data, for example. A CR queue 805 supports a video teleconference from Port 1 of ST 200. A CRWB queue 807 stores packets carrying data related to a custom application (e.g., voice-over-IP). A LVLLB queue 809 is used to store, for example, TCP Sync packets and HTTP (Hypertext Transport Protocol) GET messages. ST 200 provides two Normal Burst queues 811 and 813 for user data. The depths of queues 807, 811, and 813 can be dynamically changed to enhance the efficient utilization of such queues.

In the example of FIG. 8, each of the queues 801–813, depending on the user service that it corresponds to, has a mapping to the PDS (i.e., rate and/or volume) and a service weight (i.e., priority). The PDS mapping is relevant to scheduling of the packets for transmission. Column 815 in the diagram shows the number of packets in the queue; for instance, queue 801 is empty. Further, as indicated by the PDS Mapping column 817, Internal ST BoD queue 801 may employ excess slots of both volume and rate allocations, may pre-empt a volume/rate slot, and use a contention slot. The Internal ST Management queue 803 is shown to have 15 packets and a service weight of 10 (which is a unitless number), with a profile limit of 8. By way of example, queue 803 provides a BoD request for 8 packets. As for the Constant Rate queue 805, the PDS mapping is to a rate service; because rate services are given high priority by definition a rate is specified (e.g., 2 packets/frame). A Constant Rate with Burst queue 807 may use the rate service, as well as the volume service for any packets in excess of the rate. Queue 807 has a priority order of 2 and an associated rate of 2 packets/frame. The priority order specifies the relative prioritization among other high priority traffic. For instance, the LVLL queue 809 has a priority order of 1; as a consequence, packets in this queue 809 are given preferential treatment over the packets in queue 807 during queue servicing. The Normal Burst queues 811 and 813 both use volume service and have equal service weights (e.g., 45). Queues 811 and 813 have profile limits of 106, according to an exemplary embodiment.

It should be noted that ST 200 use only a subset of the queues discussed above. Use of specific queues depends on the profiles of the particular ST 200. For example, a residential ST that is configured for Internet access service, may only use Normal Burst queues 811 and 813 for transmitting data. It should further be noted that other queues can be defined as new user services are created.

For N/HPB and CRWB queues, ST 200 supports a dynamic buffer management scheme. Queue control logic 402 (FIG. 4) examines the queue traffic statistics that was collected during some configurable period in the past; in an exemplary embodiment, this pre-determined period is about 3 seconds. This queue management scheme allows any single burst queue to grow to the total size of all memory buffers (e.g., up to 3 seconds at the ST's full channel rate), assuming that that queue was using the entire channel rate. When many queues are sharing the channel rate, each queue is sized according to how much data it is successfully transferring. To prevent starving the more active queues, slow queues are not allowed to accumulate a large number of buffers.

Each queue has a minimum size so that it may ramp-up to a faster transfer rate (as in TCP slow-start). These minimum reserved buffers also reduce the total buffer space that can be assigned dynamically. The ST 200 sets the maximum queue depth equivalent to the number of internal system packets that were allocated to that queue during the previous pre-determined period. The queue depth is set according to the following equation:

New Queue Depth=$F$*(sum of allocations for last $A$ frames)+$B$(units in packets), where A is Allocations To Consider (Number of Uplink Transmission Frames: 10–50, default=30); B is the Minimum Queue Depth (for Packets: 10–100, default=32); and F is the Queue Depth Factor, which is a configurable parameter to adjust the impact of the past allocations.

Packets already on the queue beyond the new depth are not dropped. However, no additional packets can be added until the queue drops below this threshold. After processing the BoD allocations for the upcoming frame, the ST 200 re-evaluates the sizes of all of the burst queues.

For CRWB queues, ST 200 supports fixed, configurable maximum buffer sizes that limit the maximum burst size. Within this maximum queue depth, the ST 200 applies the dynamic buffer management scheme, as described above.

For optimal TCP throughput (without spoofing), the ST 200 needs to buffer enough data to allow for the maximum growth of the TCP windows given the round-trip time and channel rate. For these requirements, the transport platform buffer memory needs have been rounded up to 3 seconds at the ST's full channel rate.

For Constant Rate queues, the ST 200 supports a fixed, configurable buffer size that can accommodate and limit input jitter. The LVLL queue 809 also has fixed, configurable buffer size corresponding to the maximum queue depth.

Turning back to the discussion of FIG. 4. When an ST queue supporting a user service reaches its maximum depth, the queue drop control logic 401 drops any additional packets (referred to as the tail-drop mechanism). This tail-drop mechanism is employed by ST 200 to respond to congestion or a user service that is exceeding its profile— causing buffer space to become exhausted. Queue drop control logic 401 continues to drop packets until some have been drawn off the front of the queue, making room for new packets. This is an effective congestion control mechanism in that dropping of an IP datagram causes TCP to slow down the data transmission rate.

User Port Adaptations may need to use other methods of determining which packets should be dropped before sending them to the Transport Platform queues 403. The ST Transport Platform 301 provides information on the current depth of all of its queues for use by the adaptations in support of additional queue control mechanisms. Also, an indication is provided when a queue is full, so that the User Port Adaptation can avoid packet dropping.

ST 200 drops the entire user data packet if accepting that packet would exceed the buffer space currently allocated for that queue. Individual system packets are not dropped, as dropping causes partial drop of a user packet.

As discussed above, ST 200 maps traffic from each transport service instance to one or more Packet Delivery Services (PDS). The rate and volume Packet Delivery Services are implemented using a Bandwidth Control Protocol or a High Volume Uplink. These and the data contention and persistent Aloha PDS, are discussed in greater detail later.

The Low-Volume Low-Latency (LVLL) service is primarily served using data contention. Whenever possible, the LVLL queue will pre-empt volume PTOs from any other user service or use excess rate, volume, or Persistent Aloha PTOs from any user service. When a User Port Adaptation sends a packet to the LVLL service, if the packet is larger than one code block or the LVLL queue is full, the transport platform must re-map the packet to a different configured service queue group. Within that group, the transport platform uses the destination downlink to map to a specific queue.

A variety of mechanisms are used to perform traffic metering in the ST 200, depending upon the type of packet delivery service. Many of the mechanisms use the basic construct of the token bucket to implement a traffic profile. Each traffic profile is characterized by a Packet Refill Rate (PRR in units of system packets), a Refill Time Period (RTP in units of system transmission frames), and a Maximum Burst Size (MBS in units of system packets). The traffic profile token bucket starts full at the level specified by the Maximum Burst Size. The ST 200 subtracts one from the token bucket for each system packet that the ST forwards under the profile. The ST 200 replenishes the token bucket at the Packet Refill Rate on the Refill Time Period boundaries up to the limit of the Maximum Burst Size. At any given time, if the token bucket has been decremented to zero, any additional system packets are not forwarded on the path protected by that profile. Such packets are "blocked" and continue to wait on queue.

No usage (no profile) can be configured by setting the Maximum Burst Size parameter to zero. Unlimited usage can be configured by setting the profile parameters to values permitting traffic greater than the channel rate.

Volume services (Normal/High-priority Burst and the volume portion of Constant Rate with Burst) are metered differently in HVUL and non-HVUL modes. In the normal volume (non-HVUL) mode, volume services are metered at the BOD Request step using one token bucket for the HPV traffic profile and another token bucket for the total HPV+ LPV traffic profile. Each profile controls all traffic for the PDS or combination of PDSs independent of the destination. A packet must pass both profile tests before the ST 200 will include it in a high-priority volume BOD request. The two profiles provide a flexible mechanism that can be used to control the amount of traffic allowed for burst-based User Data Transport Services. It can be used to limit the uplink data rate of a terminal to less than the full channel rate, thereby supporting different grades of service for the same ST type.

In High Volume Uplink mode, volume services are metered separately for each HVUL destination downlink region during Queue Scheduling by scheduling no more packets for each transmission frame than the maximum set by the destination downlink algorithm. The limits are set per region by the HVUL congestion management mechanism described below.

Rate services (Constant Rate and the rate portion of Constant Rate with Burst) are handled differently by the ST 200 than volume services; they are metered by shaping during Queue Scheduling. Token buckets are not used. At the time of connection setup (or equivalent), each rate-based service is assigned a Constant Packet Rate per uplink transmission frame, which has been approved for usage through the NOCC 111. Each rate queue is shaped to the CPR by drawing that number of packets (if present) off the queue for each transmission frame. These packets are not counted against the volume traffic profiles since they are a constant. So, for the Constant Rate with Burst Service, the constant rate portion is not counted against the volume traffic profiles, but any packets in the queue due to bursts above the constant rate are limited by the volume traffic profiles. Data contention, preemption, and excess slot usage are metered using individual token buckets during Queue Servicing.

The ST 200 supports a number of queues for carrying internally sourced messages. These messages include bandwidth requests, address resolution requests, and all management messages to the NOCC 111. In order to support NOCC 111 server congestion management, each internal traffic queue that uses a volume PDS is metered by the ST application that sources the messages.

Use of Persistent Aloha (PA) is limited directly by the basic PA mechanism. If more than a small number of packets accumulate on the PA queue, then the queue is serviced using volume requests, which are metered as described above.

The ST 200 implements a prioritization mechanism which controls how different volume services (Normal/High-priority Burst and the volume portion of Constant Rate with Burst) are drawn against the traffic profiles for bandwidth requests and allocation sharing. This mechanism can be used to favor one volume service over another, or to ensure fair treatment between multiple instances of the same service. Also, certain internally sourced messages need to be given priority treatment. Each instance of Normal/High-priority Burst and Constant Rate with Burst service is configured with a Service Weight. The ST 200 determines how it apportions packets for each volume traffic profile using the Service Weight of all of the queues drawing on that traffic profile. The ST first serves the internal queues in a fixed priority order. Next the ST 200 serves all of the N/HPB and CRWB queues in a ratio determined by their relative Service Weights until the profile is exhausted. The service order is as follows: (1) serve the internal queues in this order until their individual traffic profiles are exhausted: a) signaling message queue, and b) normal management message queue; (2) serve these user service queues by their relative Service Weights until the HPV profile or the HPV+LPV profile is exhausted: a) CRWB queues configured to use high-priority volume, and b) High Priority Burst queues; and (3) serve these user service queues by their relative Service Weights until the HPV+LPV profile is exhausted: a) Constant Rate with Burst queues configured to use low-priority volume, and b) Normal Priority Burst queues.

ST 200 performs uplink service scheduling at the time that it processes the received bandwidth allocation messages (or the equivalent for a High Volume Uplink channel) for an upcoming transmission frame. The ST 200 examines all of its allocations and produces an optimal schedule plan for mapping service packets to the available transmission slots. The schedule plan also determines if any slots are available for contention transmissions. The ST 200 prepares the schedule plan for rate-based services with the goal of minimizing the jitter experienced by each of the traffic flows. It should be noted that for a High Volume Uplink channel, the ST 200 may spread both the rate and volume opportunities more evenly than the current Bandwidth Request algorithm, since the ST 200 does not have to be limited by slot allocations. This would improve the jitter and the impact of HVUL bursts on the system. This can be accomplished by first scheduling the packet transmission opportunities in numerical order and then applying a random mapping to re-sort all the PTOs. The same mapping may be used for each frame.

In the normal volume (non-HVUL) mode, the ST prepares the schedule plan for volume-based services with the goal of weighting the volume bandwidth allocations among the queues that have outstanding volume requests. For each queue, the ST 200 keeps track of the number of packets that were used to make High Priority or Low Priority Volume bandwidth requests. The ST 200 loops through all of the slots allocated for volume packet delivery in the upcoming frame. Each volume allocation is made for a specific set of destinations. The ST 200 shares that allocation among the queues that made requests to those destinations. The allocation is shared among the queues using the service order and weighting mechanism described above.

For slots allocated for High Priority Volume, the ST 200 serves the internal queues in order (up to the amount requested) until the allocation is exhausted. Next, the ST 200 serves these user service queues by their relative Service Weights (up to the amount requested) until the allocation is exhausted: (1) Constant Rate with Burst queues configured to use high-priority volume, and (2) High Priority Burst queues.

For slots allocated for Low Priority Volume, the ST 200 serves these user service queues by their relative Service Weights (up to the amount requested) until the allocation is exhausted: (1) Constant Rate with Burst queues configured to use low-priority volume, and (2) Normal Priority Burst queues.

In High Volume Uplink mode, the ST 200 prepares the schedule plan for volume-based services with the goal of weighting the volume bandwidth allocations among the volume services while metering separately for each HVUL destination downlink region. The ST 200 schedules no more packets for each transmission frame than the maximum set by the destination downlink algorithm. The HVUL ST is allocated a specified number of slots in every uplink frame. The allocation is shared among the queues using the service order and weighting mechanism. The queues are served in this order: (1) the internal queues in order (up to the downlink limits) until the allocation is exhausted; and (2) user service queues by their relative Service Weights (up to the downlink limits) until the allocation is exhausted: a) Constant Rate with Burst queues configured to use high-priority volume, and b) High Priority Burst queues.

For slots allocated for Low Priority Volume, ST 200 serve these user service queues by their relative Service Weights (up to the downlink limits) until the allocation is exhausted: (1) Constant Rate with Burst queues configured to use low-priority volume, and (2) Normal Priority Burst queues.

In the normal volume (non-HVUL) mode, the ST 200 plans for contention transmission whenever possible. Contention is not used in the High Volume Uplink mode. There must be at least three unused contiguous slots available to schedule contention. This allows for tuning to and from the contention channel, since each re-tuning requires one slot time. After scheduling for rate and volume, the ST 200 scans the schedule plan for open areas of at least three slots. In each of these, it schedules for possible contention transmission. Each frame, the ST 200 picks a contention channel to use and will "park" on that channel just in case a packet allowed to use contention comes along.

The ST 200 also schedules the usage of preemption and excess slots for the services allowed to use these features. Preemption and excess slots can be used for any types of rate, volume, or contention packet transmission opportunities. For each packet transmission opportunity (PTO) in the schedule plan, the ST 200 specifies a list of queues: (1) queues that can pre-empt this allocation (primarily BOD and Low-volume-Low Latency packets); (2) the main queue for this allocation; and (3) queues that use excess slots (primarily ST management and Low-volume-Low Latency packets). It should be noted that the relationships of which queues are allowed to pre-empt others and which queues are allowed to use the excess slots are known when the user services are configured. Thus, for each PTO, the schedule plan can point to a list of queues that define the relationships for that main queue.

The ST 200 performs uplink packet servicing at a time as close as possible to each upcoming packet transmission opportunity. Using the schedule plan and the packet servicing behaviors, the ST 200 draws a packet from the appropriate queue and forwards the packet to the remaining uplink functions.

ST 200 performs the basic servicing of the Rate-based queues as follows. When the packet servicing function processes a Rate packet transmission opportunity in the schedule plan that is assigned to a specific queue, the ST 200 takes a system packet's worth of data off of the specified queue and forwards it to the next uplink function. A packet will be available on that queue unless the traffic has exceeded its expected jitter or the traffic flow is pausing or terminating. If no packet is available on the queue, this packet transmit opportunity may be used for other services as described below. It should be noted that traffic from other Constant Rate services will not use this opportunity, since the Rate traffic is strictly scheduled to support shaping and jitter reduction.

For the basic servicing of Volume-based queues, ST 200 follows a similar process. When the packet servicing function processes a Volume packet transmission opportunity in the schedule plan that is assigned to a specific queue, the ST takes a system packet's worth of data off of the specified queue and forwards it to the next uplink function. A packet will be available on that queue which corresponds to a Volume request unless one of the preemption mechanisms (such as internal traffic taking unused Rate packet transmission opportunities) has removed it early.

ST 200 serves an internally-sourced packet (if any are ready) for each unused Rate packet transmission opportunity. Internally-sourced messages include bandwidth requests, address resolution requests, and all management messages to the NOCC 111.

As shown, at time of servicing, Internal ST BoD queue 801 has one packet to transmit. The Internal ST Management queue 803 has 15 packets. The Constant Rate queue 805 has no packets, while the CRWB queue 807 has 10 packets stored. The LVLLB queue 809 stores 2 packets. Normal Burst queues 811 and 813 stores 60 and 120 packets, respectively. Based in part on the previous allocations to these queues 801–813, the BoD control logic 705 generates a schedule plan that assigns packet transmission opportunities (PTOs), or slots, to the queues 801–813.

Figure 9:
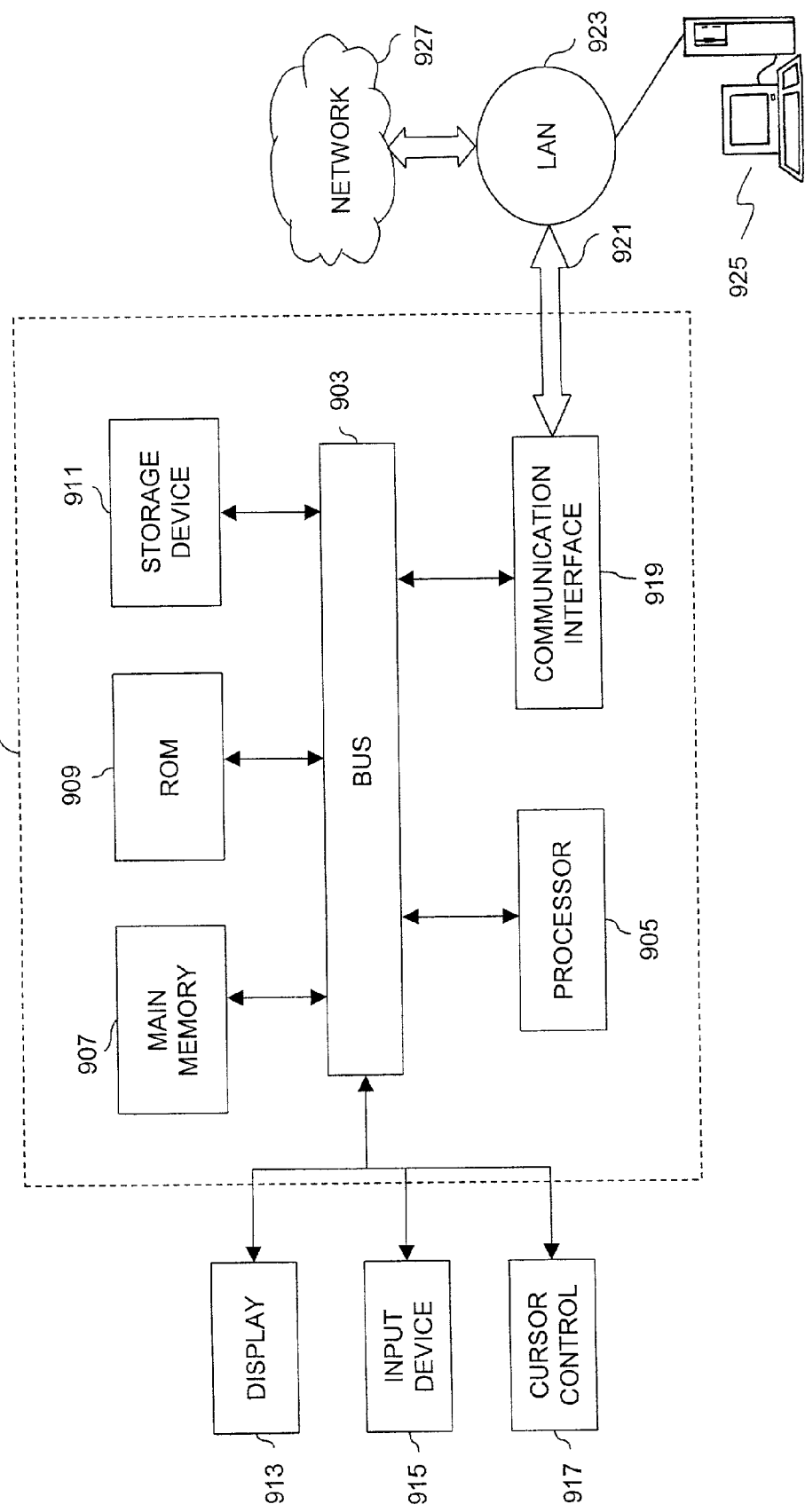
FIG. 9 is a diagram of a computer system that can perform traffic classification, in accordance with an embodiment of the present invention.

FIG. 9 illustrates a computer system 901 upon which an embodiment according to the present invention may be implemented to perform traffic classification functions. Computer system 901 includes a bus 903 or other communication mechanism for communicating information, and a processor 905 coupled with bus 903 for processing the information. Computer system 901 also includes a main memory 907, such as a random access memory (RAM) or other dynamic storage device, coupled to bus 903 for storing information and instructions to be executed by processor 905. In addition, main memory 907 may be used for storing temporary variables or other intermediate information during execution of instructions to be executed by processor 905. Computer system 901 further includes a read only memory (ROM) 909 or other static storage device coupled to bus 903 for storing static information and instructions for processor 905. A storage device 911, such as a magnetic disk, flash memory, or optical disk, is provided and coupled to bus 903 for storing information and instructions.

Computer system 901 may be coupled via bus 903 to a display 913, such as a cathode ray tube (CRT), for displaying information to a computer user. An input device 915, including alphanumeric and other keys, is coupled to bus 903 for communicating information and command selections to processor 905. Another type of user input device is cursor control 917, such as a mouse, a trackball, or cursor direction keys for communicating direction information and command selections to processor 905 and for controlling cursor movement on display 913.

According to one embodiment, the traffic classification functions are provided by computer system 901 in response to processor 905 executing one or more sequences of one or more instructions contained in main memory 907. Such instructions may be read into main memory 907 from another computer-readable medium, such as storage device 911. Execution of the sequences of instructions contained in main memory 907 causes processor 905 to perform the process steps described herein. One or more processors in a multi-processing arrangement may also be employed to execute the sequences of instructions contained in main memory 907. In alternative embodiments, hard-wired circuitry may be used in place of or in combination with software instructions. Thus, embodiments are not limited to any specific combination of hardware circuitry and software.

Further, the traffic classification process of the present invention may reside on a computer-readable medium. The term "computer-readable medium" as used herein refers to any medium that participates in providing instructions to processor 905 for execution. Such a medium may take many forms, including but not limited to, non-volatile media, volatile media, and transmission media. Non-volatile media includes, for example, optical or magnetic disks, such as storage device 911. Volatile media includes dynamic memory, such as main memory 907. Transmission media includes coaxial cables, copper wire and fiber optics, including the wires that comprise bus 903. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk of a remote computer. The remote computer can load the instructions relating to the classification process to control call processing remotely into its dynamic memory and send the instructions over a telephone line using a modem. A modem local to computer system 901 can receive the data on the telephone line and use an infrared transmitter to convert the data to an infrared signal. An infrared detector coupled to bus 903 can receive the data carried in the infrared signal and place the data on bus 903. Bus 903 carries the data to main memory 907, from which processor 905 retrieves and executes the instructions. The instructions received by main memory 907 may optionally be stored on storage device 911 either before or after execution by processor 905.

Computer system 901 also includes a communication interface 919 coupled to bus 903. Communication interface 919 provides a two-way data communication coupling to a network link 921 that is connected to a local network 923. For example, communication interface 919 may be a network interface card to attach to any packet switched local area network (LAN); e.g., a Universal Serial Bus (USB). As another example, communication interface 919 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 919 sends and receives electrical, electromagnetic or optical signals that carry digital data streams representing various types of information.

Network link 921 typically provides data communication through one or more networks to other data devices. For example, network link 921 may provide a connection through local network 923 to a host computer 925 or to data equipment operated by a service provider, which provides data communication services through a communication network 927 (e.g., the Internet). LAN 923 and network 927 both use electrical, electromagnetic or optical signals that carry digital data streams. The signals through the various networks and the signals on network link 921 and through communication interface 919, which carry the digital data to and from computer system 901, are exemplary forms of carrier waves transporting the information. Computer system 901 can transmit notifications and receive data, including program code, through the network(s), network link 921 and communication interface 919.

The techniques described herein provide several advantages over prior approaches to processing data traffic for transmission over a satellite communications system. Terminal 200 includes a user interface 203 that receives a packet associated with an application from a host, and classification logic 208 that classifies the packet into one of many transport services based upon the corresponding application. The satellite terminal 200 also includes a mapping logic 301 that maps the one transport service to a packet delivery service. This arrangement advantageously permits an identified message flow to be efficiently processed, thereby reducing network latency and reducing user response time.

Obviously, numerous modifications and variations of the present invention are possible in light of the above teachings. It is therefore to be understood that within the scope of the appended claims, the invention may be practiced otherwise than as specifically described herein.

What is claimed is:

1. A method of processing packets for transmission over a satellite communications network, the method comprising:
   receiving a packet associated with an application from a host;
   classifying the packet into one of a plurality of transport services based upon the application and at least one classification rule associated with the application; and
   mapping the one transport service to one of a plurality of packet delivery services, wherein the packet is stored in a queue that is mapped to the one packet delivery service, and is assigned a service weight, and the packet is scheduled for transmission based on the mapping of the queue to the one packet delivery service and the service weight.

2. The method according to claim 1, wherein the classifying step comprises:
   determining the application associated with the received packet based upon header information of the received packet, wherein the header information includes at least one of source address, destination address, source port, destination port, and type of service information.

3. The method according to claim 1, wherein the application exhibits at least one of a constant traffic pattern, bursty traffic pattern, and a combination thereof, and the at least one classification rule being predefined according to the traffic pattern of the application.

4. The method according to claim 3, wherein the transport services include a constant rate service for supporting the constant traffic, a constant rate with burst service for supporting the combination of the constant traffic and the bursty traffic, a priority burst service for supporting the bursty traffic, and a low volume service for supporting the bursty traffic that is low in volume and requires low latency through the satellite communications network.

5. The method according to claim 4, wherein the packet delivery services include rate access for establishing a constant rate communication channel, volume access for establishing a bandwidth-on-demand communication channel, and contention access for establishing a contention communication channel.

6. The method according to claim 5, wherein the one transport service is the constant rate service, the method further comprising:
   determining whether the received packet exceeds a predetermined committed information rate (CIR);
   selectively dropping the packet based upon the determining step; and
   utilizing the rate access packet delivery service to forward the packet.

7. The method according to claim 5, wherein the one transport service is the constant rate with burst transport service, the method further comprising:
   determining whether the received packet is below a predetermined committed information rate (CIR), as measured by a leaky bucket profile;
   utilizing the volume access packet delivery service to forward the packet upon determining that the received packet is above the CIR; and
   utilizing the rate access packet delivery service to forward the packet upon determining that the received packet is at or below the CIR.

8. The method according to claim 5, wherein the one transport service is the priority burst transport service, the method further comprising:
   determining whether an arrival rate exceeds a threshold;
   utilizing the volume access packet delivery service to forward the packet if the determined arrival rate exceeds the threshold; and
   utilizing the contention access packet delivery service to forward the packet if the determined arrival rate does not exceed the threshold.

9. The method according to claim 5, wherein the one transport service is the low volume service, the method further comprising:
   utilizing the contention access packet delivery service to forward the packet.

10. The method according to claim 1, wherein the classifying step comprises:
    specifying a default transport service for the one transport service.

11. The method according to claim 1, wherein the depth of the queue is dynamically configurable.

12. The method according to claim 1, wherein an order of precedence in which the classification rules are applied is dynamically configurable.

13. A terminal apparatus for transmitting packets over a satellite communications network, comprising:
    a user interface configured to receive a packet associated with an application from a host;
    classification logic coupled to the user interface and configured to classify the packet into one of a plurality of transport services based upon the application and at least one classification rule associated with the application; and
    mapping logic configured to map the one transport service to one of a plurality of packet delivery services, wherein the packet is stored in a queue that is mapped to the one packet delivery service, and is assigned a service weight, and the packet is scheduled for transmission based on the mapping of tile queue to the one packet delivery service and the service weight.

14. The apparatus according to claim 13, wherein the classification logic determines the application associated with the received packet based upon header information of the received packet, wherein the header information includes at least one of source address, destination address, source port, destination port, and type of service information.

15. The apparatus according to claim 13, wherein the application exhibits at least one of a constant traffic pattern, bursty traffic pattern, and a combination thereof, and the at least one classification rule being predefined according to the traffic pattern of the application.

16. The apparatus according to claim 15, wherein the transport services include a constant rate service for supporting the constant traffic, a constant rate with burst service for supporting the combination of the constant traffic and the bursty traffic, a priority burst service for supporting the bursty traffic, and a low volume service for supporting the bursty traffic that is low in volume and requires low latency through the satellite communications network.

17. The apparatus according to claim 16, wherein the packet delivery services include rate access for establishing a constant rate communication channel, volume access for establishing a bandwidth-on-demand communication channel, and contention access for establishing a contention communication channel.

18. The apparatus according to claim 17, wherein the one transport service is the constant rate service, the classification logic being configured to determine whether the received packet exceeds a predetermined committed information rate (CIR), and to selectively drop the packet based upon the determination, the apparatus utilizing the rate access packet delivery service to forward the packet.

19. The apparatus according to claim 17, wherein the one transport service is the constant rate with burst transport service, the classification logic being configured to determine whether the received packet is below a predetermined committed information rate (CIR), the apparatus utilizing the volume access packet delivery service to forward the packet upon determining that the received packet is above the CIR and utilizing the rate access packet delivery service to forward the packet upon determining that the received packet is at or below the CIR.

20. The apparatus according to claim 17, wherein the one transport service is the priority burst transport service, the apparatus utilizing the volume access packet delivery service to forward the packet.

21. The apparatus according to claim 17, wherein the one transport service is the low volume service, the apparatus utilizing the contention access packet delivery service to forward the packet.

22. The apparatus according to claim 13, wherein the classification logic specifies a default transport service for the one transport service.

23. The apparatus according to claim 13, wherein the depth of the queue is dynamically configurable.

24. The apparatus according to claim 13, wherein an order of precedence in which the classification rules are applied is dynamically configurable.

25. A terminal apparatus for transmitting packets over a satellite communications network, comprising:
 a user interface configured to receive a plurality of packets associated with a plurality of applications from at least one host;
 classification logic coupled to the user interface and configured to classify each packet into one of a plurality of transport services based upon the corresponding application and at least one classification rule associated with the corresponding application; and
 mapping logic configured to map each transport service to a packet delivery service, wherein each packet is stored in a queue that is mapped to the packet delivery service associated with the packet, and is assigned a service weight, and each packet is scheduled for transmission based on the mapping of the queue to the associated packet delivery service and the assigned service weight.

26. The apparatus according to claim 25, wherein the classification logic determines the application associated with each received packet based upon header information of the packet, wherein the header information includes at least one of source address, destination address, source port, destination port, and type of service information.

27. The apparatus according to claim 25, wherein each application exhibits at least one of a constant traffic pattern, bursty traffic pattern, and a combination thereof, and the at least one classification rule associated with each application being predefined according to the traffic pattern of the application.

28. The apparatus according to claim 27, wherein the transport services include a constant rate service for supporting the constant traffic, a constant rate with burst service for supporting the combination of the constant traffic and the bursty traffic, a priority burst service for supporting the bursty traffic, and a low volume service for supporting the bursty traffic that is low in volume and requires low latency through the satellite communications network.

29. The apparatus according to claim 28, wherein the packet delivery services include rate access for establishing a constant rate communication channel, volume access for establishing a bandwidth-on-demand communication channel, and contention access for establishing a contention communication channel.

30. The apparatus according to claim 29, wherein for each packet classified to the constant rate service, the classification logic being further configured to determine whether the packet exceeds a predetermined committed information rate (CIR), and to selectively drop the packet based upon the determination, and the apparatus utilizing the rate access packet delivery service to forward the packets.

31. The apparatus according to claim 29, wherein for each packet classified to the constant rate with burst transport service, the classification logic being further configured to determine whether the packet is below a predetermined committed information rate (CIR), the apparatus utilizing the volume access packet delivery service to forward the packet upon determining that the packet is above the CIR and utilizing the rate access packet delivery service to forward the packet upon determining that the packet is at or below the CIR.

32. The apparatus according to claim 29, wherein for each packet classified to the priority burst transport service, the apparatus utilizing the volume access packet delivery service to forward the packet.

33. The apparatus according to claim 29, wherein for each packet classified to the low volume service, the apparatus utilizing the contention access packet delivery service to forward the packet.

34. The apparatus according to claim 25, wherein the classification logic specifies a default transport service for each of the transport services.

35. The apparatus according to claim 25, wherein the depth of each queue is dynamically configurable.

36. The apparatus according to claim 25, wherein an order of precedence in which the classification rules are applied is dynamically configurable.

37. A method of processing packets for transmission over a satellite communications network, the method comprising:
 receiving a plurality of packets associated with a plurality of applications from at least one host;
 classifying each packet into one of a plurality of transport services based upon the corresponding application and at least one classification rule associated with the corresponding application; and
 mapping each transport service to a packet delivery service, wherein each packet is stored in a queue that is mapped to the packet delivery service associated with the packet, and is assigned a service weight, and each packet is scheduled for transmission based on the mapping of the queue to the associated packet delivery service and the assigned service weight.

38. The method according to claim 37, wherein the classifying step comprises:
 determining the application associated with each packet based upon header information of the packet, wherein the header information includes at least one of source address, destination address, source port, destination port, and type of service information.

39. The method according to claim 37, wherein each application exhibits at least one of a constant traffic pattern, bursty traffic pattern, and a combination thereof, and the at least one classification rule associated with each application being predefined according to the traffic pattern of the application.

40. The method according to claim 39, wherein the transport services include a constant service for supporting the constant rate traffic, a constant rate with burst service for supporting the combination of the constant traffic and the bursty traffic, a priority burst service for supporting the bursty traffic, and a low volume service for supporting the bursty traffic that is low in volume and requires low latency through the satellite communications network.

41. The method according to claim 40, wherein the packet delivery services include rate access for establishing a constant rate communication channel, volume access for establishing a bandwidth-on-demand communication channel, and contention access for establishing a contention communication channel.

42. The method according to claim 41, wherein for each packet classified to the constant rate service, the method further comprising:
   determining whether the packet exceeds a predetermined committed information rate (CIR);
   selectively dropping the packet based upon the determining step; and
   utilizing the rate access packet delivery service to forward the packets.

43. The method according to claim 41, wherein for each packet classified to the constant rate with burst transport service, the method further comprising:
   determining whether the packet is below a predetermined committed information rate (CIR), as measured by a leaky bucket profile;
   utilizing the volume access packet delivery service to forward the packet upon determining that the packet is above the CIR; and
   utilizing the rate access packet delivery service to forward the packet upon determining that the packet is at or below the CIR.

44. The method according to claim 41, wherein for each packet classified to the priority burst transport service, the method further comprising:
   determining whether an arrival rate exceeds a threshold;
   utilizing the volume access packet delivery service to forward the packet if the determined arrival rate exceeds the threshold; and
   utilizing the contention access packet delivery service to forward the packet if the determined arrival rate does not exceed the threshold.

45. The method according to claim 41, wherein for each packet classified to the low volume service, the method further comprising:
   utilizing the contention access packet delivery service to forward the packet.

46. The method according to claim 37, wherein the classifying step comprises:
   specifying a default transport service for the one transport service.

47. The apparatus according to claim 37, wherein the depth of each queue is dynamically configurable.

48. The apparatus according to claim 37, wherein an order of precedence in which the classification rules are applied is dynamically configurable.

* * * * *